US012734560B2

(12) United States Patent
Shiraishi et al.

(10) Patent No.: US 12,734,560 B2
(45) Date of Patent: Sep. 15, 2026

(54) METHOD FOR MANUFACTURING WATER ABSORBENT RESIN

(71) Applicant: Sumitomo Seika Chemicals Co., Ltd., Harima-cho (JP)

(72) Inventors: Nobumasa Shiraishi, Himeji (JP); Yoichi Murakawa, Himeji (JP); Nobuyuki Kanja, Himeji (JP)

(73) Assignee: Sumitomo Seika Chemicals Co., Ltd., Harima-cho (JP)

( * ) Notice: Subject to any disclaimer, the term of this patent is extended or adjusted under 35 U.S.C. 154(b) by 543 days.

(21) Appl. No.: 17/995,027

(22) PCT Filed: Mar. 12, 2021

(86) PCT No.: PCT/JP2021/010030
§ 371 (c)(1),
(2) Date: Sep. 29, 2022

(87) PCT Pub. No.: WO2021/200031
PCT Pub. Date: Oct. 7, 2021

(65) Prior Publication Data

US 2023/0149981 A1 May 18, 2023

(30) Foreign Application Priority Data

Mar. 31, 2020 (JP) ................................ 2020-062793

(51) Int. Cl.
*B08B 3/02* (2006.01)
*B01J 20/30* (2006.01)
(Continued)

(52) U.S. Cl.
CPC ............... *B08B 3/024* (2013.01); *B01J 20/30* (2013.01); *B05B 3/06* (2013.01); *B08B 9/093* (2013.01);
(Continued)

(58) Field of Classification Search
USPC ........................................................... 526/72
See application file for complete search history.

(56) References Cited

U.S. PATENT DOCUMENTS 3,985,572 A * 10/1976 Petermann .......... B05B 13/0421 134/167 R
9,670,292 B2 6/2017 Kotake et al.
(Continued)

FOREIGN PATENT DOCUMENTS

JP 53-21483 U1 2/1978
JP H06-328044 A 11/1994
(Continued)

OTHER PUBLICATIONS

JP 2013-204860 machine translation, Heat Exchange Structure, and Manufacturing Device for Water-Absorbing Resin Having the Heat Exchange Structure, Kotake (Year: 2013).*
(Continued)

*Primary Examiner* — Cristi J Tate-Sims
(74) *Attorney, Agent, or Firm* — Knobbe, Martens, Olson & Bear, LLP

(57) ABSTRACT

A method for manufacturing a water-absorbent resin includes a cleaning step of cleaning the inside of a heat exchanger that is connected to a vessel holding an aqueous gel-like polymer as a precursor of the water-absorbent resin and is configured to cool a gas containing the polymer generated in the vessel. The heat exchanger, and includes: a plurality of pipes that have an elongated path through which the gas passes, in which the gas is cooled due to heat dissipation during passage through the paths; a chamber that is arranged above the plurality of pipes and is in communication with openings at upper ends of the plurality of pipes; and a cleaner that sprays a cleaning liquid in the chamber. The cleaning step includes at least cleaning the
(Continued)

inside of the chamber by spraying the cleaning liquid from the cleaner in the chamber.

20 Claims, 4 Drawing Sheets

(51) Int. Cl.

| | |
|---|---|
| ***B05B 3/06*** | (2006.01) |
| ***B08B 9/093*** | (2006.01) |
| ***F28D 7/16*** | (2006.01) |
| ***F28G 1/16*** | (2006.01) |
| ***F28G 3/16*** | (2006.01) |

(52) U.S. Cl.

CPC ............... *F28D 7/16* (2013.01); *F28G 1/163* (2013.01); *F28G 1/166* (2013.01); *F28G 3/16* (2013.01)

(56) References Cited

U.S. PATENT DOCUMENTS

2016/0243597 A1* 8/2016 Shawver ................ F28G 15/02
2018/0030181 A1 2/2018 Emoto

FOREIGN PATENT DOCUMENTS

JP H07-149805 A 6/1995
JP 2003-334471 A 11/2003
JP 2013-076073 A 4/2013
JP 2013-204860 A 10/2013

OTHER PUBLICATIONS

JP 2003-334471 machine translation, HREE-Dimensional Rotary Nozzle and Wastewater Treatment Apparatus Using the Same, Karasawa (Year: 2003).*
Extended European Search Report for European Application No. 21782186.7, dated Feb. 29, 2024 in 7 pages.
International Search Report in PCT/JP2021/010030 issued May 18, 2021.
Written Opinion received in PCT/JP2021/010030, dated May 18, 2021.
Japanese Office Action for Application No. 2022-511765 dated Oct. 24, 2024 (in 6 pages).
Korean Office Action for Korean App. No. 10-2022-7030122, dated Nov. 23, 2025 (in 11 pages).
Chinese Office Action for App. No. 202180019290.2, dated Jan. 22, 2026 (in14 pages).

* cited by examiner

METHOD FOR MANUFACTURING WATER ABSORBENT RESIN

TECHNICAL FIELD

The present invention relates to a method for manufacturing a water-absorbent resin.

BACKGROUND ART

A water-absorbent resin can be manufactured by polymerizing monomers serving as a raw material to form an aqueous gel-like polymer and then drying the polymer. During the polymerization reaction, heat of polymerization is generated. Thus, the polymerization tank for use in polymerization is often connected to a heat exchanger to remove the heat of polymerization. This type of heat exchanger is typically configured to cool and condense a gas delivered from the polymerization tank, and then return the condensed matter to the polymerization tank (see Patent Literature 1).

The gas delivered to the heat exchanger usually contains a polymer. As pointed out in Patent Literature 1, the polymer may clog the pipes for heat transfer in the heat exchanger. In order to deal with this problem, Patent Literature 1 proposes suppressing the clogging of pipes with a polymer by obliquely attaching a plate-like member with a plurality of through holes in a chamber connected to the upstream side of a plurality of pipes for heat transfer, and collecting the polymer at a low place on the top surface of the member.

CITATION LIST

Patent Literature

Patent Literature 1: JP 2013-204860A

SUMMARY OF INVENTION

Technical Problem

However, even with the method described in Patent Literature 1, the clogging of the pipes cannot be sufficiently prevented, and the pipes still often become clogged. Accordingly, it is necessary to regularly stop the operation of the heat exchanger, disassemble the heat exchanger, and clean the inside thereof, which is very burdensome to users. Similar problems may occur in other heat exchangers connected to a vessel holding an aqueous gel-like polymer such as a concentrator for use in evaporating a liquid component after the end of a polymerization reaction.

An object of the present invention is to provide a method for manufacturing a water-absorbent resin that is capable of effectively preventing the clogging of pipes of a heat exchanger.

Solution to Problem

A method for manufacturing a water-absorbent resin according to a first aspect includes a cleaning step of cleaning an inside of a heat exchanger that is connected to a vessel holding an aqueous gel-like polymer as a precursor of the water-absorbent resin and is configured to cool a gas containing the polymer produced in the vessel. The heat exchanger includes: a plurality of pipes that have elongated paths through which the gas passes, and in which the gas is cooled due to heat dissipation during passage through the paths; a chamber that is arranged above the plurality of pipes and is in communication with openings at upper ends of the plurality of pipes; and a cleaner that sprays a cleaning liquid in the chamber. The cleaning step includes at least cleaning an inside of the chamber by spraying the cleaning liquid from the cleaner in the chamber.

A method for manufacturing a water-absorbent resin according to a second aspect is the manufacturing method according to the first aspect in which the cleaner is configured to spray the cleaning liquid toward at least an inner wall surface of the chamber.

A method for manufacturing a water-absorbent resin according to a third aspect is the manufacturing method according to the second aspect in which the cleaner is configured to spray the cleaning liquid toward at least a top surface included in the inner wall surface of the chamber.

A method for manufacturing a water-absorbent resin according to a fourth aspect is the manufacturing method according to any one of the first to third aspects in which the cleaner has a spray nozzle configured to rotate around a first shaft extending in a first direction while rotating around a second shaft extending in a second direction that intersects the first direction, and configured to spray the cleaning liquid while rotating around the first shaft and the second shaft.

A method for manufacturing a water-absorbent resin according to a fifth aspect is the manufacturing method according to any one of the first to fourth aspects in which the vessel is a polymerization tank in which monomers serving as a raw material for the water-absorbent resin are polymerized.

A method for manufacturing a water-absorbent resin according to a sixth aspect is the manufacturing method according to any one of the first to fifth aspects in which the cleaning step includes removing a lump of the polymer adhering to at least one of the inner wall surface of the chamber and inner wall surfaces of the pipes by spraying the cleaning liquid from the cleaner in the chamber.

A method for manufacturing a water-absorbent resin according to a seventh aspect is the manufacturing method according to the sixth aspect in which the cleaning step includes breaking up and knocking off the lump of the polymer adhering to the inner wall surface of the chamber by spraying the cleaning liquid toward the inner wall surface of the chamber.

Advantageous Effects of Invention

According to the foregoing aspects, the cleaning liquid is sprayed from the cleaner in the chamber that is arranged above the plurality of pipes in the heat exchanger and is in communication with the openings at the upper ends of the plurality of pipes. This makes it possible to remove the aqueous gel-like polymer that is the precursor of the water-absorbent resin adhering to the inside of the chamber, thereby effectively prevent the clogging of the pipes. As a result, the water-absorbent resin can be manufactured efficiently.

BRIEF DESCRIPTION OF DRAWINGS

FIG. 1 is a general configuration diagram of an apparatus for manufacturing a water-absorbent resin according to an embodiment of the present invention;

DESCRIPTION OF EMBODIMENTS

Figure 2:
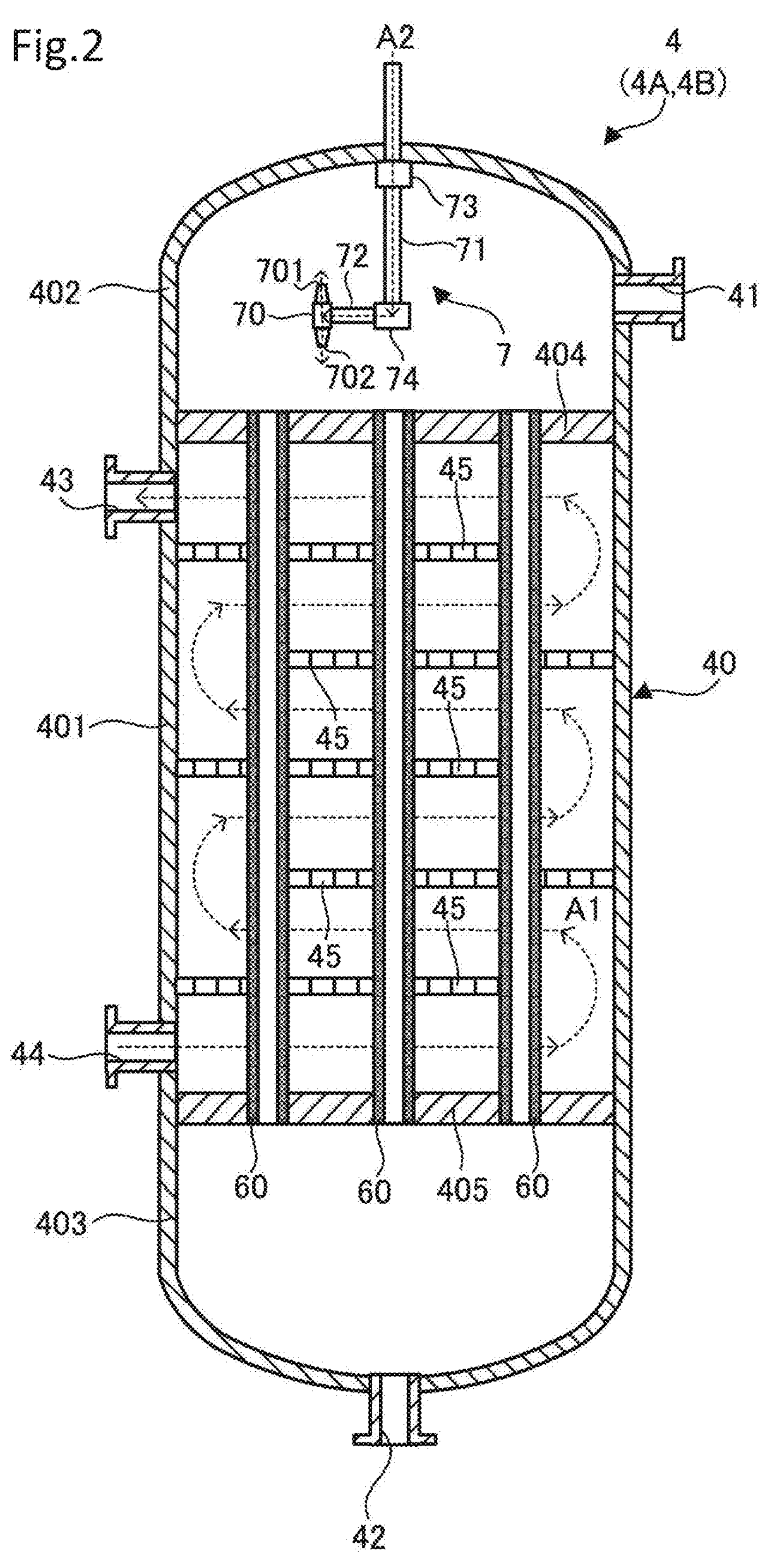
FIG. 2 is a cross-sectional view of a heat exchanger according to the embodiment of the present invention.

A method for manufacturing a water-absorbent resin according to an embodiment of the present invention will be described below with reference to the drawings.

1. Apparatus for Manufacturing Water-Absorbent Resin

Figure 1:
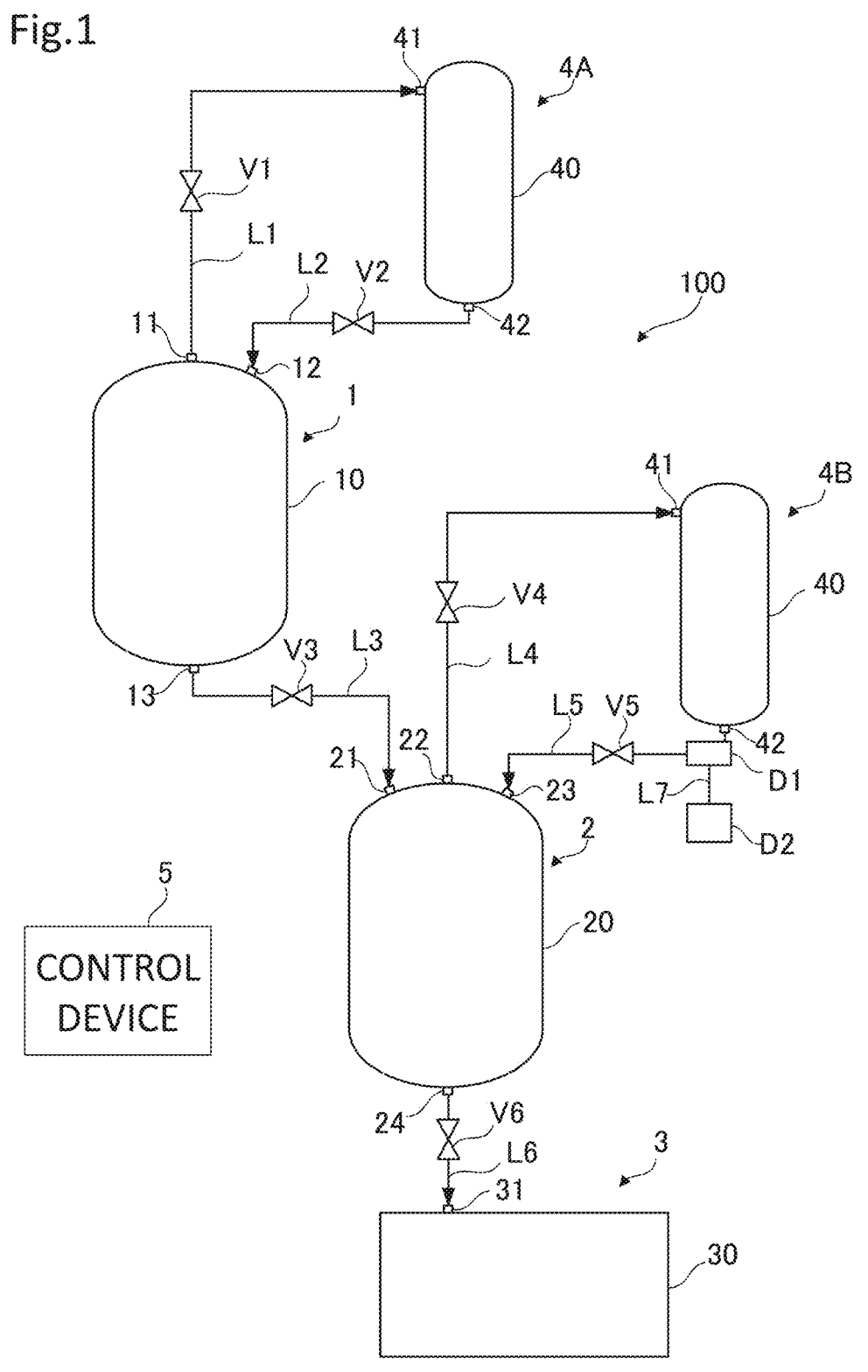

FIG. 1 is a general configuration diagram of a water-absorbent resin manufacturing apparatus 100 for use in performing a method for manufacturing a water-absorbent resin according to the present embodiment. Water-absorbent resin is widely used in various applications such as hygiene products for paper diapers and sanitary items, daily necessities such as pet sheets, water-absorbent paper towel for food, water-stop materials for cables, industrial materials such as condensation-preventive material, and water retention agents and soil improvement agents for greening, agriculture, and gardening. Water-absorbent resin is manufactured by polymerizing monomers serving as a raw material to form a polymer.

As illustrated in FIG. 1, a water-absorbent resin manufacturing apparatus 100 includes a polymerizer 1 and a concentrator 2. The polymerizer 1 polymerizes monomers serving as a raw material for the water-absorbent resin to form a slurry containing an aqueous gel-like polymer (a liquid containing an aqueous gel-like polymer). The concentrator 2 evaporates a liquid component of the slurry delivered from the polymerizer 1 to concentrate the slurry and produce a concentrated polymer liquid. The manufacturing apparatus 100 further includes a dryer 3. The dryer 3 dries the concentrated polymer liquid delivered from the concentrator 2 (that is, volatilizes the liquid component). In the case of producing an aqueous gel-like polymer by a reverse-phase suspension polymerization method, the liquid component mainly contains a hydrocarbon dispersion medium and water. In the case of producing an aqueous gel-like polymer by an aqueous polymerization method, the liquid component mainly contains water.

As illustrated in FIG. 1, the manufacturing apparatus 100 includes two heat exchangers 4A and 4B. During the polymerization reaction in the polymerizer 1, heat of polymerization is generated. During the concentration process in the concentrator 2, the slurry is heated. The heat exchanger 4A is connected to the polymerizer 1 to remove the heat of polymerization. The heat exchanger 4B is connected to the concentrator 2 to remove heat produced during the concentration process.

As illustrated in FIG. 1, the manufacturing apparatus 100 further includes a control device 5 that controls the operations of the polymerizer 1, the concentrator 2, the dryer 3, and the heat exchangers 4A and 4B to control the water-absorbent resin manufacturing process. The control device 5 is typically implemented as a computer controlled by programs.

The polymerizer 1, the concentrator 2, the dryer 3, and the heat exchangers 4A and 4B will be described in detail below, while touching on various devices connected to these devices 1, 2, 3, 4A, and 4B as appropriate.

2. Configurations of Components

2-1. Polymerizer

The polymerizer 1 has a polymerization tank 10. The polymerization tank 10 is a vessel that holds monomers serving as a raw material for the water-absorbent resin, for example, water-soluble ethylene unsaturated monomers, and a liquid component, such that a gas-phase component is formed above these materials. In the polymerization tank 10, the monomers and the liquid component are appropriately stirred by a stirrer (not illustrated) and are heated by a heater (not illustrated), so that the polymerization reaction of the monomers proceeds to produce an aqueous gel-like polymer. The stirrer and the heater are connected to the control device 5, and operations thereof are controlled by the control device 5. Accordingly, a slurry containing the aqueous gel-like polymer as a precursor of the water-absorbent resin is held in the polymerization tank 10.

The polymerization tank 10 has openings 11 and 12 at the upper part. One end of a pipe L1 is connected to the upper opening 11, and the other end of the pipe L1 is connected to an opening 41 in the heat exchanger 4A described later. A gas heated by the heat of polymerization resulting from the polymerization reaction is discharged from the opening 11, passes through the pipe L1, and flows into the heat exchanger 4A via the opening 41. A valve V1 is attached to the pipe L1. The opening and closing of the valve V1 is controlled by the control device 5 in order to control the flow of the gas via the pipe L1.

One end of another pipe L2 is connected to the other upper opening 12, and the other end of the pipe L2 is connected to an opening 42 in the heat exchanger 4A described later. The gas delivered from the polymerization tank 10 to the heat exchanger 4A is cooled and condensed to a cooled fluid containing a liquid and a gas in the heat exchanger 4A. The cooled fluid is discharged from the opening 42, passes through the pipe L2, and flows into the polymerization tank 10 via the opening 12. Accordingly, the heat of polymerization is removed from the polymerization tank 10. A valve V2 is attached to the pipe L2. The opening and closing of the valve V2 is controlled by the control device 5 in order to control the flow of the cooled fluid via the pipe L2.

The polymerization tank 10 has an opening 13 at the lower part. One end of a pipe L3 is connected to the lower opening 13, and the other end of the pipe L3 is connected to an opening 21 in the concentrator 2 described later. A slurry generated by the polymerization reaction in the polymerization tank 10 is discharged from the opening 13, passes through the pipe L3, and flows into the concentrator 2 via the opening 21. A valve V3 is attached to the pipe L3. The opening and closing of the valve V3 is controlled by the control device 5 in order to control the flow of the slurry via the pipe L3.

2-2. Concentrator

The concentrator 2 has a concentration tank 20. The concentration tank 20 has openings 21, 22, and 23 at the upper part. The upper opening 21 is connected to the opening 13 in the polymerization tank 10 via the pipe L3 as described above. The concentration tank 20 is a vessel that holds the slurry delivered from the polymerization tank 10 via the pipe L3 such that a gas-phase component is formed above the slurry. In the concentration tank 20, the slurry is stirred as appropriate by a stirrer (not illustrated) and is heated by a heater (not illustrated), so that the liquid component in the slurry evaporates and the slurry becomes concentrated. The stirrer and the heater are connected to the control device 5, and operations thereof are controlled by the control device 5. Accordingly, the concentration tank 20 holds a concentrated liquid containing an aqueous gel-like polymer as the precursor of a water-absorbent resin.

One end of another pipe L4 is connected to another upper opening 22, and the other end of the pipe L4 is connected to the opening 41 in the heat exchanger 4B described later. A gas heated by the concentration process is discharged from the opening 22, passes through the pipe L4, and flows into the heat exchanger 4B via the opening 41. A valve V4 is attached to the pipe L4. The opening and closing of the valve V4 is controlled by the control device 5 in order to control the flow of the gas via the pipe L4.

One end of another pipe L5 is connected to the other opening 23 at the upper part, and the other end of the pipe L5 is connected to the opening 42 in the heat exchanger 4B described later. The gas delivered from the concentration tank 20 to the heat exchanger 4B is cooled and condensed in the heat exchanger 4B to form a cooled fluid containing a liquid and a gas. The cooled fluid is discharged from the opening 42, passes through the pipe L5, and an oil component therein flows into the concentration tank 20. Accordingly, heat is removed from the concentration tank 20. A valve V5 is attached to the pipe L5. The opening and closing of the valve V5 is controlled by the control device 5 in order to control the flow of the cooled fluid via the pipe L5.

In the present embodiment, an oil separation device D1 is attached to the pipe L5. The oil separation device D1 is used to manufacture a polymer by a reverse-phase suspension polymerization method, and is not required to be used in the case of employing a water-solution polymerization method. The oil separation device D1 is a device that separates an oil component (hydrocarbon dispersion medium) and a water component from a liquid component, and is connected to a collector D2 via a pipe L7 branched from the pipe L5. The water component separated from the cooled fluid by the oil separation device D1 is discharged from the system and collected in the collector D2, rather than being returned to the concentration tank 20. This promotes dehydration of the slurry in the concentration tank 20. On the other hand, the oil component separated from the cooled fluid by the oil separation device D1 is returned to the concentration tank 20 via the opening 23.

Note that the opening 23, the valve V5, the oil separation device D1 and the like may be omitted, and all of the cooled fluid discharged from the opening 42 in the heat exchanger 4B may be discharged from the system and collected in the collector D2. In this case, an oil component is preferably added to the concentration tank 20 as appropriate.

The concentration tank 20 has an opening 24 at the lower part. One end of a pipe L6 is connected to the lower opening 24, and the other end of the pipe L6 is connected to an opening 31 in the dryer 3 described later. The concentrated liquid generated by the concentration process in the concentration tank 20 is discharged from the opening 24, passes through the pipe L6, and flows into the dryer 3 via the opening 31. A valve V6 is attached to the pipe L6. The opening and closing of the valve V6 is controlled by the control device 5 in order to control the flow of the concentrated liquid via the pipe L6.

2-3. Dryer

The dryer 3 has a drying chamber 30. The drying chamber 30 has the opening 31 at the upper part. The upper opening 31 is connected to the opening 24 in the concentration tank 20 via the pipe L6 as described above. The drying chamber 30 receives the concentrated liquid delivered from the concentration tank 20 via the pipe L6 and heats the concentrated liquid by a heater (not illustrated) to dry the polymer of the water-absorbent resin contained in the concentrated liquid. The heater is connected to the control device 5, and the operation thereof is controlled by the control device 5.

Note that the concentrator 2 and the heat exchanger 4B connected thereto may be omitted, and the polymerizer 1 may be connected directly to the dryer 3. In this case, the dryer 3 concentrates and dries the slurry at the same time.

2-4. Heat Exchanger

Next, the structure of the heat exchangers 4A and 4B will be described with reference to FIG. 2. The heat exchanger 4A and 4B have the same structure, and hereinafter, they will be collectively called heat exchanger 4 without differentiation therebetween, and the structure thereof will be collectively described.

The heat exchanger 4 is a device that cools the gas containing the aqueous gel-like polymer as a precursor of the water-absorbent resin, which is produced in the polymerization tank 10 or the concentration tank 20. The heat exchanger 4 has a casing 40. The casing 40 has a cylindrical trunk part 401, a dome-like upper chamber 402 connected to the upper end of the trunk part 401, and an inverse dome-like lower chamber 403 connected to the lower end of the trunk part 401. The inner space of the trunk part 401 and the inner space of the upper chamber 402 are partitioned and separated from each other by a partition wall 404. Similarly, the inner space of the trunk part 401 and the inner space of the lower chamber 403 are partitioned and separated from each other by a partition wall 405.

The opening 41 is formed in the wall surface part of the upper chamber 402 to let the inside and outside of the upper chamber 402 communicate with each other. The opening 41 is connected to the opening 11 in the polymerization tank 10 via the pipe L1 or is connected to the opening 22 in the concentration tank 20 via the pipe L4, as described above. Therefore, the gas containing the aqueous gel-like polymer is introduced from the polymerization tank 10 or the concentration tank 20 into the upper chamber 402 via the opening 41.

A plurality of pipes 60 that are vertically elongated are arranged inside the trunk part 401. These pipes 60 extend between a plurality of openings in the upper partition wall 404 and a plurality of openings in the lower partition wall 405. Therefore, the upper chamber 402 is arranged above the plurality of pipes 60 and is in communication with openings at upper ends of the plurality of pipes 60. The lower chamber 403 is arranged under the plurality of pipes 60 and is in communication with openings at lower ends of the plurality of pipes 60.

The pipes 60 each define an elongated path. The gas delivered from the polymerization tank 10 or the concentration tank 20 is introduced into the upper chamber 402, and then is introduced from the upper chamber 402 into these paths. While passing through the paths, the gas dissipates heat and is cooled and condensed into a cooled fluid containing a liquid and a gas. Thereafter, the cooled fluid is introduced into the lower chamber 403.

The lowermost part of the lower chamber 403 has the opening 42 that lets the inside and outside of the lower chamber 403 communicate with each other. The opening 42 is connected to the opening 12 in the polymerization tank 10 via the pipe L2 or is connected to the opening 23 in the concentration tank 20 via the pipe L5. Therefore, the cooled fluid is discharged from the lower chamber 403 into the polymerization tank 10 or the concentration tank 20 via the opening 42.

The wall surface part of the trunk part 401 has the openings 43 and 44 that let the inside and outside of the trunk part 401 communicate with each other. The openings 43 and 44 are separately arranged at the upper part and lower part of the trunk part 401. A plurality of guide plates 45 are arranged inside the trunk part 401 with predetermined spacings therebetween in the vertical direction. The guide plates 45 have a plurality of openings into which the plurality of corresponding pipes 60 are inserted.

Either the opening 43 or the opening 44 constitutes an introduction port through which a heat-exchange fluid is introduced into the trunk part 401, and the other one constitutes a discharge port through which the heat-exchange fluid is discharged from the trunk part 401. Although there is no particular limitation this, the heat-exchange fluid is water or air, for example. In the example of FIG. 2, the lower opening 44 is the introduction port, the upper opening 43 is the discharge port, and the flow of the heat-exchange fluid is indicated with arrows A1. The heat-exchange fluid introduced into the trunk part 401 via the introduction port that is either one of the openings 43 and 44 is guided by the plurality of guide plates 45 in the trunk part 401, passes through a winding course to the discharge port that is the other one of the openings 43 and 44, and is discharged from the trunk part 401 via the discharge port. Since the heat-exchange fluid comes into contact with the plurality of pipes 60 while flowing through the trunk part 401 from the introduction port to the discharge port, efficient heat exchange is achieved between the heat-exchange fluid and the gas flowing in the pipes 60 to facilitate the condensation of the gas.

As described above, the gas delivered into the heat exchanger 4 contains a polymer. If the polymer excessively enters and adheres to the inside of the pipes 60 in the heat exchanger 4 and clog the pipes 60, it is necessary to perform burdensome work of stopping the operation of the heat exchanger 4, and disassembling and cleaning the heat exchanger 4 on a regular basis. In the present embodiment, in order to effectively prevent the clogging of the pipes 60, a cleaner 7 is arranged in the upper chamber 402. The cleaner 7 sprays a cleaning liquid in the upper chamber 402 to clean the inside of the heat exchanger 4 (mainly the inside of the upper chamber 402).

The present inventors have found that the clogging of the pipes 60 is more likely to occur due to the polymer adhering to the inner wall surfaces (in particular, the top surface) of the upper chamber 402 than due to the polymer adhering to the inner wall surfaces of the pipes 60. That is, if the polymer adheres to the inner wall surfaces, in particular the top surface of the upper chamber 402 and grows to large lumps, the lumps may then drop off to clog the pipes 60. The same thing can be said for the case where the polymer adheres to the upper surface of the upper partition wall 404.

Based on the above findings, the inventors have discovered that the clogging of the pipes 60 can be effectively prevented by cleaning the inside of the upper chamber 402, more preferably, by spraying a cleaning liquid onto at least the inner wall surfaces of the upper chamber 402 (cleaning the inner wall surfaces). The inside of the upper chamber 402 includes surfaces defining the inner space of the upper chamber 402. In the present embodiment, the inside of the upper chamber 402 includes the inner wall surfaces of the upper chamber 402 and the upper surface of the upper partition wall 404.

The inventors have also found that the inner wall surfaces of the upper chamber 402 that are to be cleaned preferably include at least the top surface, and that the clogging of the pipes 60 can be further effectively prevented by not only cleaning the inside of the upper chamber 402 (preferably, the inner wall surfaces of the upper chamber 402, more preferably, the top surface included in the inner wall surfaces of the upper chamber 402) but also cleaning the inside of the pipes 60. In this respect, the cleaner 7 in the present embodiment can effectively clean not only the inner wall surfaces including the top surface of the upper chamber 402 and the upper surface of the upper partition wall 404 but also the inside of the pipes 60.

The cleaner 7 includes a nozzle 70, a first shaft 71 that extends vertically, a second shaft 72 that extends horizontally, a first motor 73 that drives the first shaft 71 to rotate, and a second motor 74 that drives the second shaft 72 to rotate. The first motor 73 is fixed to the center of the top surface of the upper chamber 402 in a plan view, rotatably supports the upper part of the first shaft 71, and drives the first shaft 71 to rotate around an axis parallel to the vertical direction. The second motor 74 is fixed to the lower part of the first shaft 71, rotatably supports one end of the second shaft 72, and drives the second shaft 72 to rotate around an axis parallel to the horizontal direction. The nozzle 70 is fixed to the other end of the second shaft 72.

In the present embodiment, the nozzle 70 is arranged in the upper chamber 402 and has two jetting ports 701 and 702. The jetting ports 701 and 702 are both open in directions intersecting the second shaft 72 (in the present embodiment, directions orthogonal to the second shaft 72). The jetting ports 701 and 702 are also arranged at positions separated from each other by 180° around the second shaft 72, and are open in opposite directions. The first motor 73 and the second motor 74 are connected to the control device 5. The driving of the first motor 73 and the second motor 74, that is to say the rotational operations of the first shaft 71 and the second shaft 72, are controlled by the control device 5.

When executing the cleaning step of cleaning the inside of the heat exchanger 4, the control device 5 drives the first motor 73 and the second motor 74 at the same time. Accordingly, the jetting ports 701 and 702 included in the nozzle 70 rotate around the first shaft 71 while rotating around the second shaft 72. Hereinafter, the rotation around the first shaft 71 will also be called "revolution", and the rotation around the second shaft 72 will also be called "spinning".

As indicated with arrow A2 in FIG. 2, the first shaft 71 and the second shaft 72 internally have a path through which a cleaning liquid flows. In the cleaning step, the cleaning liquid is supplied from a pump (not illustrated) into the path, flows into the nozzle 70, and is sprayed through the jetting ports 701 and 702. The pump is connected to the control device 5 so that the control device 5 controls the discharge timing and discharge pressure of the cleaning liquid. The type of the cleaning liquid is not particularly limited, but is preferably water.

As described above, in the cleaning step, the jetting ports 701 and 702 spray the cleaning liquid while revolving and spinning. As a result, the cleaning liquid is sprayed three-dimensionally in every direction from the jetting ports 701 and 702 in the upper chamber 402. The cleaning liquid is sprayed onto all the inner wall surfaces of the upper chamber 402 including the top surface and side surfaces, and collides with all the surfaces to remove the adhering polymer from all the surfaces. The cleaning liquid is also sprayed down from the nozzle 70, that is to say onto the upper surface of the upper partition wall 404 and the inside of the pipes 60 to remove the adhering polymer from the upper surface of the upper partition wall 404 and the inner wall surfaces of the pipes 60.

The lower limit of the flow rate of the cleaning liquid is preferably 50 L/min, more preferably 60 L/min, and further preferably 70 L/min. The upper limit of flow rate of the cleaning liquid is preferably 250 L/min, more preferably 200 L/min, and further preferably 180 L/min. The lower limit of discharge pressure of the cleaning liquid is preferably 0.2 MPaG, more preferably 3.0 MPaG, and further preferably 5.0 MPaG. The upper limit of discharge pressure of the cleaning liquid is preferably 15 MPaG, more preferably 10 MPaG, and further preferably 8 MPaG. When the flow rate and the discharge pressure of the cleaning liquid are within the foregoing ranges, it is possible to efficiently break up and knock off lumps of the polymer on the inside of the upper chamber 402 while effectively suppressing the usage of the cleaning liquid.

3. Method for Manufacturing Water-Absorbent Resin

A method for manufacturing a water-absorbent resin using the manufacturing apparatus 100 will be described below, taking a reverse-phase suspension polymerization method as an example.

The processes for manufacturing a water-absorbent resin by the manufacturing apparatus 100 are mainly controlled by the control device 5. First, monomers serving as a raw material for a water-absorbent resin and a liquid component (a hydrocarbon dispersion medium) are put into the polymerization tank 10. The control device 5 switches the valve V1 and the valve V2 to the open state to put the polymerization tank 10 and the heat exchanger 4A in communication with each other. In this state, the control device 5 drives the stirrer and the heater included in the polymerizer 1. Accordingly, a polymerization reaction proceeds in the polymerization tank 10, and a gas containing an aqueous gel-like polymer heated by the heat of polymerization is delivered to the heat exchanger 4A via the pipe L1. The gas passes through the upper chamber 402 in the heat exchanger 4A and is cooled during passage through the pipes 60 to form a cooled fluid. The cooled fluid is then returned to the polymerization tank 10 via the pipe L2. In this manner, a slurry containing the aqueous gel-like polymer is produced in the polymerization tank 10.

Upon completion of the process in the polymerizer 1, the control device 5 stops the driving of the stirrer and the heater included in the polymerizer 1 and switches the valve V3 to the open state. Accordingly, the slurry in the polymerization tank 10 is delivered to the concentration tank 20. After the delivery of all the slurry from the polymerization tank 10 to the concentration tank 20, the control device 5 returns the valve V3 to the closed state. The control device 5 then switches the valves V4 and V5 to the open state to put the concentration tank 20 and the heat exchanger 4B in communication with each other. In this state, the control device 5 drives the stirrer and heater included in the concentrator 2. Accordingly, the process of concentration of the slurry in the concentration tank 20 proceeds, and a gas containing the heated aqueous gel-like polymer is delivered to the heat exchanger 4B via the pipe L4. The gas passes through the upper chamber 402 in the heat exchanger 4B, and is cooled during passage through the pipes 60 to form a cooled fluid. Then, the oil component contained in the cooled fluid is returned to the concentration tank 20 via the pipe L5. In this manner, a concentrated liquid of the slurry is produced in the concentration tank 20.

At the end of the process in the concentrator 2, the control device 5 stops the driving of the stirrer and heater included in the concentrator 2 and switches the valve V6 to the open state. Accordingly, the concentrated liquid in the concentration tank 20 is delivered to the drying chamber 30. After the delivery of all the concentrated liquid from the concentration tank 20 to the drying chamber 30, the control device 5 returns the valve V6 to the closed state. The control device 5 then drives the heater included in the dryer 3. Accordingly, the drying of the polymer contained in the concentrated liquid proceeds in the drying chamber 30. In this manner, a dried water-absorbent resin is manufactured in the drying chamber 30.

After the end of the process in the polymerizer 1, at the same time as the subsequent concentration process or the drying process or after these processes, the step of cleaning the inside of the heat exchanger 4A is executed. The control device 5 drives the first motor 73, the second motor 74, and the pump included in the cleaner 7 at the same time, and causes the nozzle 70 to spray a cleaning liquid from the jetting ports 701 and 702 while revolving and spinning in the upper chamber 402, thereby cleaning the inside of the upper chamber 402 and the inside of the pipes 60. At this time, along with the revolution and spinning of the nozzle 70, the cleaning liquid sprayed from the jetting ports 701 and 702 is distributed with great force directly to all the wall surfaces of the upper chamber 402 including the top surface and side surfaces and the upper surface of the upper partition wall 404. Due to the pressure, the cleaning liquid removes the adhering polymer from the inner wall surfaces of the upper chamber 402 and the upper surface of the upper partition wall 404. Accordingly, the lumps of polymer adhering to the inside of the upper chamber 402 are broken up and knocked off from the inside of the upper chamber 402.

Similarly, along with the revolution and spinning of the nozzle 70, the cleaning liquid sprayed from the jetting ports 701 and 702 is also distributed with great force directly to the inside of the pipes 60. Due to the pressure, the cleaning liquid removes the adhering polymer from the inner wall surfaces of the pipes 60. Accordingly, the lumps of polymer adhering to the inner wall surfaces of the pipes 60 are also broken up and knocked off from the inner wall surfaces of the pipes 60. As a result, the polymer is removed from the inside of the upper chamber 402 and the inside of the pipes 60. The removed polymer passes through the pipes 60 together with the cleaning liquid and is collected in the lower chamber 403. The cleaning liquid containing the polymer collected in the lower chamber 403 is appropriately discharged from the system via the opening 42.

After the end of the process in the concentrator 2, at the same as or after the subsequent drying process, the step of cleaning the inside of the heat exchanger 4B is executed. The cleaning step is executed similarly to the step of cleaning the inside of the heat exchanger 4A described above, and thus detailed description thereof will be omitted.

In the cleaning step described above, it is possible to effectively remove the polymer adhering to the inside of the pipes 60 and the inside of the upper chamber 402. As a result, it is possible to effectively prevent the clogging of the pipes 60. Consequently, the water-absorbent resin can be manufactured efficiently.

4. Modification Examples

One embodiment of the present invention has been described above. However, the present invention is not limited to the foregoing embodiment, and can be modified in various manners without departing from the gist of the present invention. For example, the following modification examples are possible.

4-1

The first shaft 71 does not need to extend vertically, and the second shaft 72 does not need to extend horizontally. The first shaft 71 and the second shaft 72 do not need to be orthogonal to each other, although they preferably intersect each other from the viewpoint of spraying the cleaning liquid in various directions.

4-2

The driving system of the nozzle 70 in the cleaner 7 is an electromotive driving system in the foregoing embodiment. Alternatively, the driving system may be a water-flow driving system.

4-3

In the foregoing embodiment, the cleaning liquid sprayed from the nozzle 70 is distributed directly to both the inside of the pipes 60 and the inside of the upper chamber 402 (the inner wall surfaces of the upper chamber 402 and the upper surface of the upper partition wall 404) in order to remove the adhering polymer from both the parts. Alternatively, the cleaning liquid sprayed from the nozzle 70 may be distributed directly to only the inside of the upper chamber 402 to remove the adhering polymer from the inside of the upper chamber 402. The portions inside the upper chamber 402 to be cleaned do not need to include the top surface of the upper chamber 402. That is, the portions inside the upper chamber 402 to be cleaned may be only the side surfaces of the upper chamber 402, only the upper surface of the upper partition wall 404, or only the side surfaces of the upper chamber 402 and the upper surface of the upper partition wall 404.

For example, the inside of the pipes 60 and the upper surface of the upper partition wall 404 can be cleaned by attaching a shower nozzle to the top surface of the upper chamber 402 and spraying the cleaning liquid downward from the shower nozzle. In addition, the side surfaces included in the inner wall surfaces of the upper chamber 402 can also be cleaned by adjusting the flow rate, discharge pressure, and spraying angle of the cleaning liquid sprayed from the shower nozzle. The cleaner 7 in the foregoing embodiment and the shower nozzle can be used in combination.

EXAMPLES

First and second examples of the present invention will be described below. However, the present invention is not limited to the first and second examples.

First Example

A manufacturing apparatus similar to the manufacturing apparatus 100 according to the foregoing embodiment was prepared and used to manufacture a water-absorbent resin by the manufacturing method according to the foregoing embodiment. That is, the series of processes of polymerizing monomers in a polymerizer and then discharging a slurry to a concentrator was executed about 350 times. In addition, each time a slurry was discharged to the concentrator, the cleaning of a heat exchanger connected to the polymerizer was performed. However, the cleaning step was suspended during the 168th to 243rd times out of the 350 times. In the cleaning step, the flow rate of the cleaning liquid was set to 73 L/min, and the discharge pressure of the cleaning liquid was set to 6.3 MPaG. A water-flow driving cleaner (automatic rotation nozzle unit "JRN-080PG" manufactured by Sugino Machine Limited) was used as the cleaner.

Figure 3:
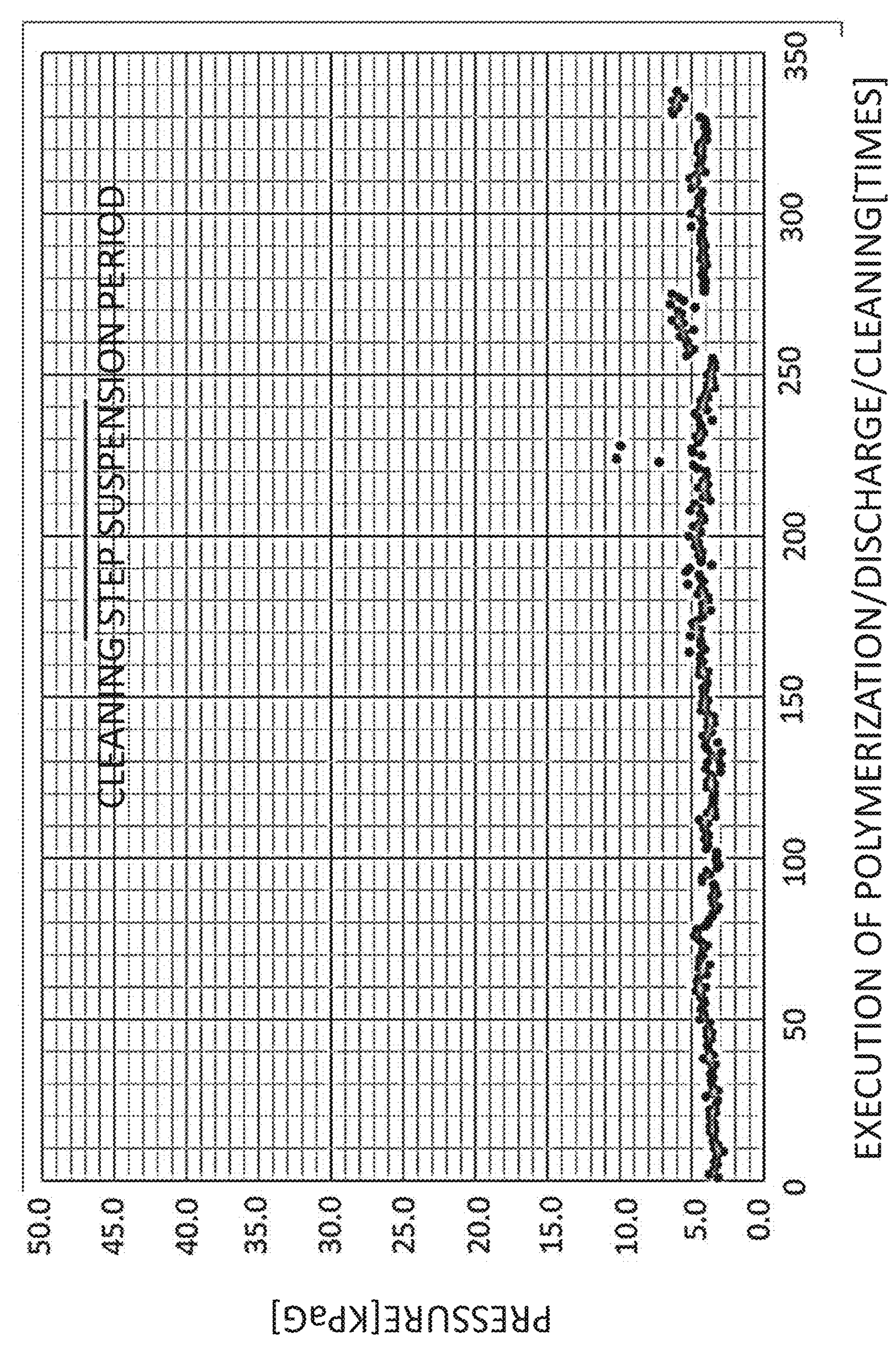
FIG. 3 is a graph indicating cleaning effects according to a first example.

The internal pressure in the polymerization tank and the heat exchanger connected thereto during the polymerization reaction was measured by a pressure gauge attached to the inside of the polymerization tank. FIG. 3 illustrates the pressure measurement results (maximum values during the polymerization reaction). The horizontal axis in FIG. 3 indicates the number of times when the series of processes was performed, including the polymerization process to the discharge process of the slurry and the step of cleaning the heat exchanger. FIG. 3 also illustrates the periods during which the cleaning step was suspended.

If the pipes in the heat exchanger become clogged, the pressure in the polymerization tank and the heat exchanger connected thereto increases. Therefore, the pressures described in FIG. 3 can be said to indicate the cleaning state of the heat exchanger. As seen from the measurement results, the pressure did not increase so much even after the execution of the polymerization process 350 times. After suspending the cleaning step, the pressure became higher. Thereafter, when the cleaning step was restarted, the pressure decreased again. This has confirmed that the cleaning step according to the first example had a high cleaning effect.

Second Example

In the manufacturing apparatus according to the first example, the cleaner was detached from the heat exchanger connected to the polymerizer, and instead, as described in modification example 4-3, a shower nozzle for spraying downward a cleaning liquid (the nozzle "JJXP150" manufactured by H. IKEUCHI & CO., LTD.) was attached to the top surface of the upper chamber. Then, the manufacturing apparatus was used to perform the series of processes of polymerizing monomers in the polymerizer and then discharging a slurry to the concentrator was performed 350 times as in the first example. Each time the slurry was discharged to the concentrator, the cleaning of the heat exchanger connected to the polymerizer was performed. In the cleaning step, the flow rate of the cleaning liquid was set to 167 L/min, and the discharge pressure of the cleaning liquid was set to 0.3 MPaG.

Figure 4:
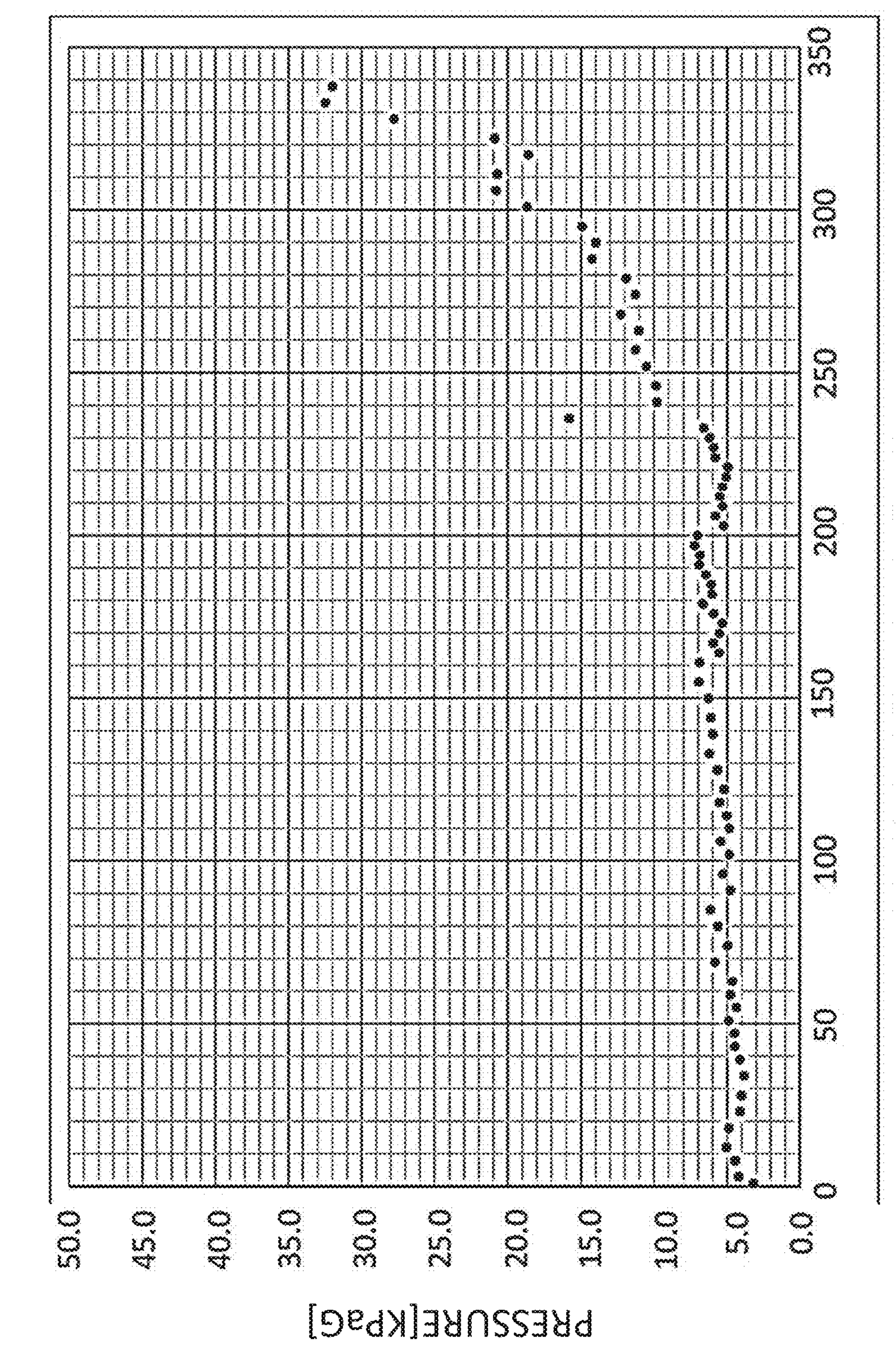
FIG. 4 is a graph indicating cleaning effects according to a second example.

FIG. 4 illustrates the inner pressure (maximum values during the polymerization reaction) in the polymerization tank and the heat exchanger connected thereto during the polymerization reaction measured by a pressure gauge attached to inside of the polymerization tank. The horizontal axis in FIG. 4 also indicates the number of times when the series of processes was performed, including the polymerization process to the discharge process of the slurry and the step of cleaning the heat exchanger.

As can be seen from the measurement results, the pressure did not increase so much even after the polymerization process was executed 200 or more times. In general, if the pressure becomes about 30 kPaG to 40 kPaG, the heat exchanger may need disassembly and cleaning. However, the measurement results were equal to or lower than the reference value even after the polymerization process was executed 300 or more times. This has confirmed that the cleaning step according to the second example, which does not include cleaning the top surface of the upper chamber, had a high cleaning effect, although falling short of the cleaning effect of the cleaning step according to the first example that includes cleaning of the top surface of the upper chamber.

LIST OF REFERENCE NUMERALS

100 Apparatus for manufacturing water-absorbent resin
1 Polymerizer
10 Polymerization tank
2 Concentrator
20 Concentration tank
3 Dryer
30 Drying chamber
4 (4A, 4B) Heat exchanger
40 Casing
401 Trunk part
402 Upper chamber
403 Lower chamber
60 Pipe
7 Cleaner
70 Nozzle
701, 702 Jetting port
71 First shaft
72 Second shaft
73 First motor
74 Second motor

The invention claimed is:

1. A method for manufacturing a water-absorbent resin, comprising:

a cleaning step of cleaning an inside of a heat exchanger that is connected to a vessel holding an aqueous gel-like polymer as a precursor of the water-absorbent resin and is configured to cool a gas containing the polymer produced in the vessel, wherein the heat exchanger comprises:

a plurality of pipes that have elongated paths through which the gas passes, and in which the gas is cooled due to heat dissipation during passage through the paths;

a chamber that is arranged above the plurality of pipes and is in communication with openings at upper ends of the plurality of pipes; and a cleaner that sprays a cleaning liquid in the chamber, wherein the cleaning step comprises at least cleaning an inside upper surface of the chamber located above the openings to the plurality of pipes and an inner wall surface of the plurality of pipes by spraying the cleaning liquid from the cleaner in the chamber.

2. The method for manufacturing a water-absorbent resin according to claim 1, wherein the cleaner is configured to spray the cleaning liquid toward at least an inner wall surface of the chamber.

3. The method for manufacturing a water-absorbent resin according to claim 2, wherein the cleaner is configured to spray the cleaning liquid toward at least a top surface included in the inner wall surface of the chamber.

4. The method for manufacturing a water-absorbent resin according to claim 1, wherein the cleaner has a spray nozzle configured to rotate around a first shaft extending in a first direction while rotating around a second shaft extending in a second direction that intersects the first direction, and configured to spray the cleaning liquid while rotating around the first shaft and the second shaft.

5. The method for manufacturing a water-absorbent resin according to claim 2, wherein the cleaner has a spray nozzle configured to rotate around a first shaft extending in a first direction while rotating around a second shaft extending in a second direction that intersects the first direction, and configured to spray the cleaning liquid while rotating around the first shaft and the second shaft.

6. The method for manufacturing a water-absorbent resin according to claim 3, wherein the cleaner has a spray nozzle configured to rotate around a first shaft extending in a first direction while rotating around a second shaft extending in a second direction that intersects the first direction, and configured to spray the cleaning liquid while rotating around the first shaft and the second shaft.

7. The method for manufacturing a water-absorbent resin according to claim 1, wherein the vessel is a polymerization tank in which monomers serving as a raw material for the water-absorbent resin are polymerized.

8. The method for manufacturing a water-absorbent resin according to claim 2, wherein the vessel is a polymerization tank in which monomers serving as a raw material for the water-absorbent resin are polymerized.

9. The method for manufacturing a water-absorbent resin according to claim 3, wherein the vessel is a polymerization tank in which monomers serving as a raw material for the water-absorbent resin are polymerized.

10. The method for manufacturing a water-absorbent resin according to claim 4, wherein the vessel is a polymerization tank in which monomers serving as a raw material for the water-absorbent resin are polymerized.

11. The method for manufacturing a water-absorbent resin according to claim 1, wherein the cleaning step comprises removing a lump of the polymer that adheres to at least one of the inner wall surface of the chamber and inner wall surfaces of the pipes by spraying the cleaning liquid from the cleaner in the chamber.

12. The method for manufacturing a water-absorbent resin according to claim 2, wherein the cleaning step comprises removing a lump of the polymer that adheres to at least one of the inner wall surface of the chamber and inner wall surfaces of the pipes by spraying the cleaning liquid from the cleaner in the chamber.

13. The method for manufacturing a water-absorbent resin according to claim 3, wherein the cleaning step comprises removing a lump of the polymer that adheres to at least one of the inner wall surface of the chamber and inner wall surfaces of the pipes by spraying the cleaning liquid from the cleaner in the chamber.

14. The method for manufacturing a water-absorbent resin according to claim 4, wherein the cleaning step comprises removing a lump of the polymer that adheres to at least one of the inner wall surface of the chamber and inner wall surfaces of the pipes by spraying the cleaning liquid from the cleaner in the chamber.

15. The method for manufacturing a water-absorbent resin according to claim 1, wherein the cleaning step comprises removing a lump of the polymer that adheres to at least one of an inner wall surface of the chamber and inner wall surfaces of the plurality of pipes by spraying the cleaning liquid from the cleaner in the chamber.

16. The method for manufacturing a water-absorbent resin according to claim 11, wherein the cleaning step comprises breaking up and knocking off the lump of the polymer adhering to the inner wall surface of the chamber by spraying the cleaning liquid toward the inner wall surface of the chamber.

17. The method for manufacturing a water-absorbent resin according to claim 12, wherein the cleaning step comprises breaking up and knocking off the lump of the polymer adhering to the inner wall surface of the chamber by spraying the cleaning liquid toward the inner wall surface of the chamber.

18. The method for manufacturing a water-absorbent resin according to claim 13, wherein the cleaning step comprises breaking up and knocking off the lump of the polymer adhering to the inner wall surface of the chamber by spraying the cleaning liquid toward the inner wall surface of the chamber.

19. The method for manufacturing a water-absorbent resin according to claim 14, wherein the cleaning step comprises breaking up and knocking off the lump of the polymer adhering to the inner wall surface of the chamber by spraying the cleaning liquid toward the inner wall surface of the chamber.

20. The method for manufacturing a water-absorbent resin according to claim 15, wherein the cleaning step comprises breaking up and knocking off the lump of the polymer adhering to the inner wall surface of the chamber by spraying the cleaning liquid toward the inner wall surface of the chamber.

* * * * *